Figure 1:
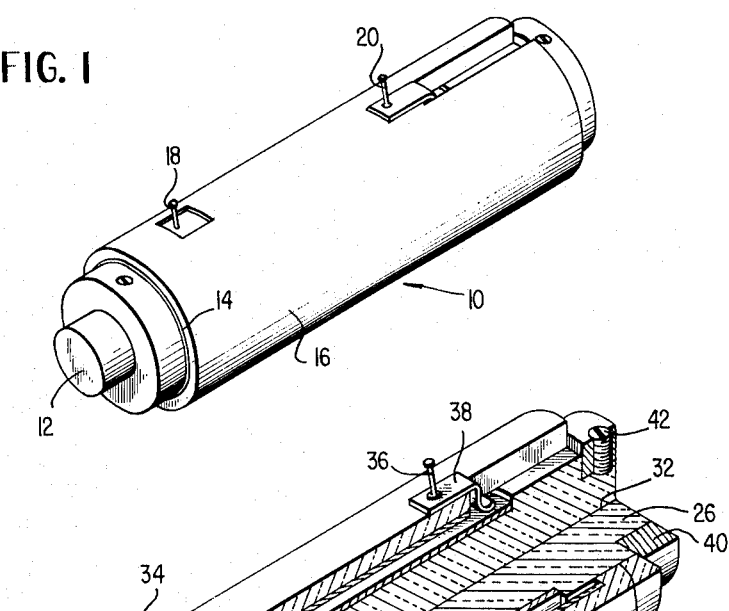

INVENTORS
VITO F. SCANDALE
JOHN R. CASWELL
BY Leo R. Reynolds
AGENT

INVENTORS
VITO F. SCANDALE
JOHN R. CASWELL
BY Leo R. Reynolds
AGENT

United States Patent Office 3,221,224
Patented Nov. 30, 1965

3,221,224
VARIABLE ELECTRICAL CAPACITOR
Vito F. Scandale, Newton, and John R. Caswell, Lincoln, Mass., assignors to Raytheon Company, Lexington, Mass., a corporation of Delaware
Filed Sept. 30, 1963, Ser. No. 312,378
6 Claims. (Cl. 317—253)

This invention pertains generally to electrical capacitors, and more particularly to miniature precision variable electrical capacitors.

The need for miniature precision variable capacitors which are stable over large ranges of environmental conditions is apparent to those skilled in the art. In the past, one type of capacitor which has been employed in an attempt to meet the desired conditions of precision in capacitive variation is the well-known butterfly construction. However, even the best of butterfly condensers have limitations which render them practically useless in certain applications. In fact, even an accuracy of only .01% is considered a laboratory standard for butterfly capacitors, due to the dependence of their capacitance on environmental conditions.

To achieve with a butterfly capacitor the linearity and stability provided by the variable capacitor of the present invention, the rotor assembly of the butterfly would have to remain in substantially perfect alignment with the stator throughout 180 degrees of rotation, and the plates of the butterfly rotor would also have to remain perpendicular to the axis of rotation. Further, even if near-perfect alignment were to be assumed, as well as a near-perfect thrust bearing, the thermal and mechanical stresses present at the junctions of the butterfly plates and the rotor shaft would be translated into axial displacement at the plate extremities and amplified by a factor of from 5 to 10, depending upon rotor plate size. This translated and amplified displacement is neither linear nor predictable.

One manner of avoiding, or at least reducing, the foregoing nonlinearities is to increase the spacing between plates, and while this produces a desirable resultant reduction of nonlinearity, there is a concomitant undesirable increase in over-all size of the capacitor for a given capacitance, precluding miniaturization and rendering more difficult the problems of shaft alignment. Also, these variable capacitors of the prior art have, for the most part, employed air as the dielectric, producing a still further limitation on miniaturization in high-voltage applications.

It is accordingly a primary object of this invention to provide a miniature variable capacitor characterized by a high degree of linearity over the capacitance range through which it is designed to be varied.

Another object of the invention is to provide a miniature variable capacitor characterized by a high degree of stability in the capacitance thereof with varying temperature and other environmental conditions.

A further object of the invention is to provide a variable capacitor which is both miniaturized and linear in operation, and yet adaptable to high-voltage applications.

In accordance with the present invention, the above and other objects are achieved by means of a miniature variable electrical capacitor comprising first and second coaxial nested electrically conductive members of partial or semicylindrical form and first and second insulating support members on which such first and second conductive members are mounted, respectively, with the first and second insulating support members having respective cooperating bearing surfaces for permitting rotary movement of such first and second conductive members about their common axis. With such construction, the capacitance between the conductive members is varied upon such relative rotary movement of the conductive members.

Figure 2:
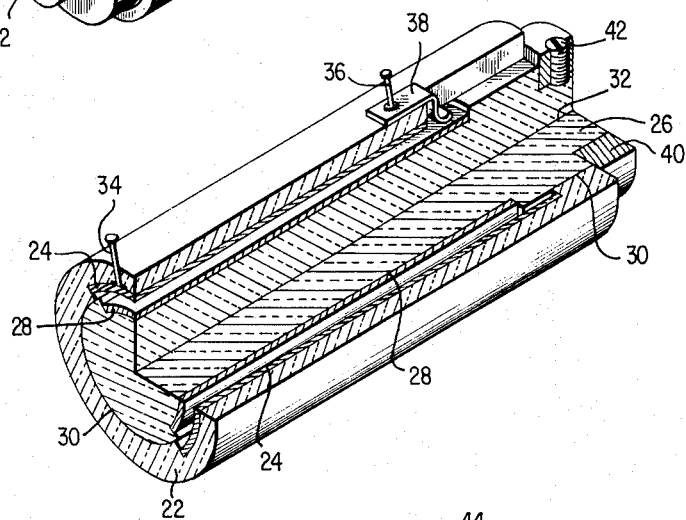
Figure 3:
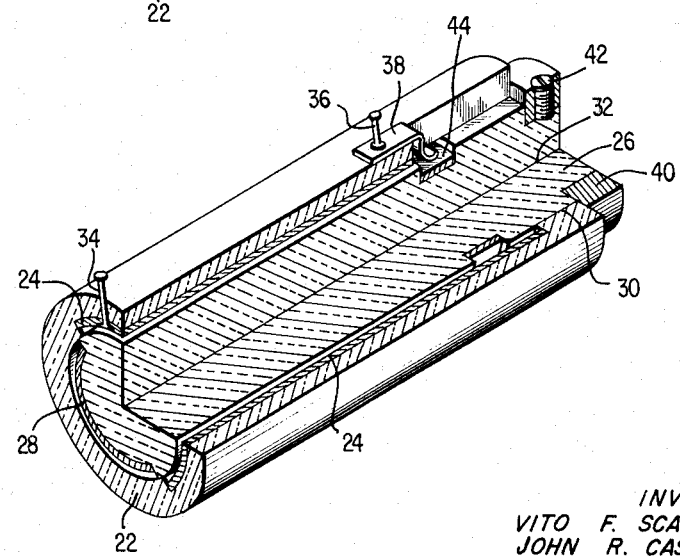
Figure 4:
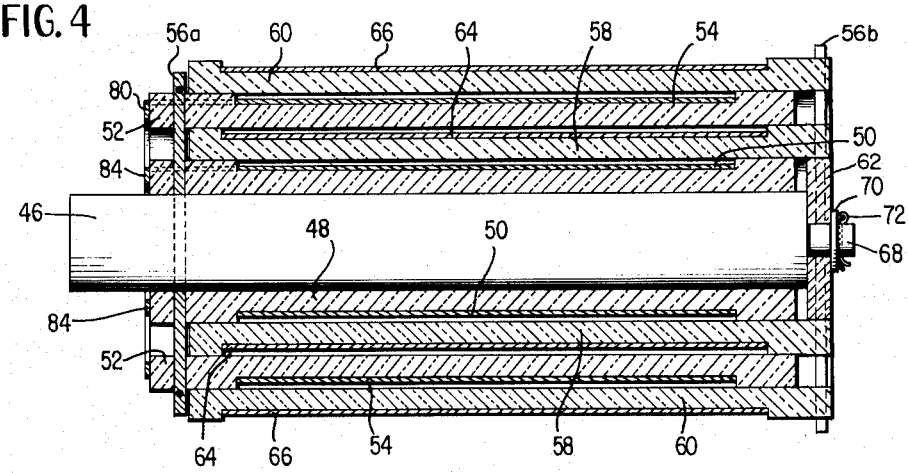
Figure 5:
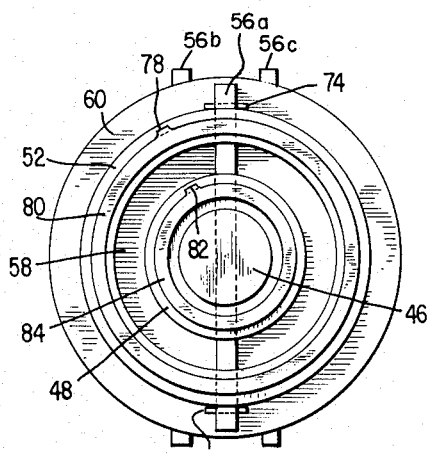
Figure 6:
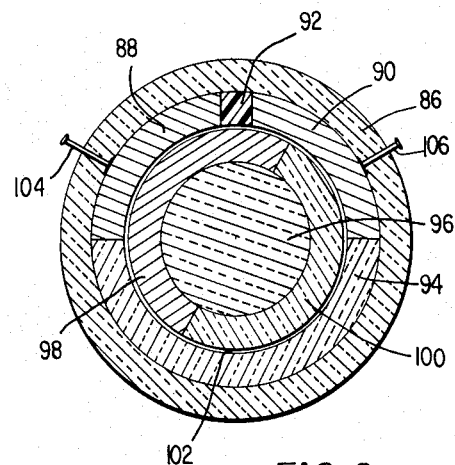
Figure 7:
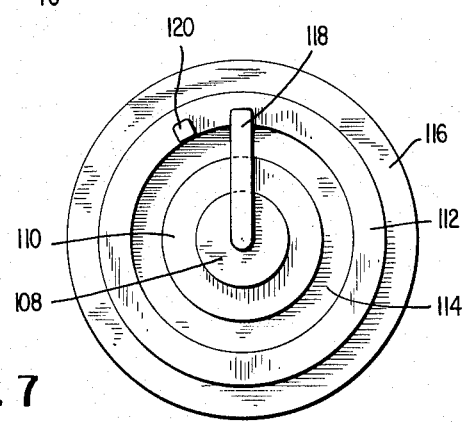

With the above considerations and objects in mind, the invention itself will now be described in connection with a preferred embodiment thereof given by way of example and not of limitation, and with reference to the accompanying drawings, in which:

FIG. 1 is a perspective view of a typical configuration of the variable capacitor of the invention, FIG. 2 is a perspective view similar to that of FIG. 1, but showing the several elements of the capacitor in section, FIG. 3 is a perspective sectional view corresponding to that of FIG. 2, but with the rotor element turned through 180 degrees from the position shown in FIG. 2, FIG. 4 is a sectional view, taken axially, of a further embodiment of the capacitor of the invention, FIG. 5 is an end view of the device illustrated in FIG. 4, FIG. 6 is a transverse sectional view of still another embodiment of the invention, and FIG. 7 is an end view similar to that of FIG. 5, but showing a modification of the interconnecting means of FIGS. 4 and 5.

Referring now particularly to FIG. 1, the miniature variable electrical capacitor of the present invention is indicated generally at 10, including a rotor shaft 12, a stator support 14 and an outer cover or case 16. Electrical terminals 18 and 20 are connected, respectively, to the stator and rotor elements, as will be better understood in connection with the description of the following figures.

FIGS. 2 and 3 show the internal elements of one preferred form of the variable capacitor of the present invention, including a stator assembly comprising a cylindrical insulating support member 22 and an electrically conductive stator plate 24 of partial or semicylindrical form mounted thereon, and a rotor assembly comprising a cylindrical insulating rotary support member 26 and a semicylindrical electrically conductive rotor plate 28 mounted thereon. The conductive elements 24 and 28 are mounted in recessed or undercut portions of the respective cylindrical insulating support members 22 and 26, and as may be seen in FIGS. 2 and 3, the exposed faces of the two plates 28 and 24 lie on cylindrical surfaces which are respectively within and without a cylindrical volume defined by the interface 30 between rotary support member 26 and stator support member 22. That is to say, the outer radius of the semicylindrical member 28, as measured from a common axis 32, is less than the outer radius of the insulating support member 26. Similarly, the inner radius of the semicylindrical stator plate 24 is greater than the inner radius of the stator support member 22.

An electrical terminal 34 is connected to the stator plate 24 through the stator insulating support 22, and a second electrical terminal 36 is connected to the rotor plate 28 by means of a brush 38 or other suitable means for providing a slipping contact to the outer surface of the rotary plate 28.

An annular retainer member 40 is mounted on the end of the rotor support 26, as by a set screw 42 or the like, so as to bear against the corresponding end of the stator support member 22 to prevent axial movement of the rotor member 26 to the left as seen in FIGS. 2 and 3. It will be understood, of course, that a similar annular member (not shown) will be provided at the other extremity of the rotor member 26 to prevent axial displacement in the opposite direction.

In FIG. 2, the rotor plate 28 is shown in substantially infraposed relationship with the stator plate 24, and in this relative position the capacitance between the two plates is at a maximum. FIG. 3, on the other hand, shows the rotor member 26 in a substantially opposite orientation, with the rotor plate 28 lying in a position diametrically opposite to that of FIG. 2. Obviously, the capacitance between the plates 28 and 24 in FIG. 3 is at a minimum.

As may be seen in FIG. 3, the rotor plate 28 includes a ring-like extension 44 at the axial position of the rotor contact brush 38, so as to provide a continuous electrical contact between terminal 36 and the conductive rotor plate 28 at all positions of rotation of the rotor element 26. Also, as may be seen in both FIGS. 2 and 3, the stator plate 24 extends slightly beyond the extremity of the rotor plate 28 in the axial direction so as to preclude a change in capacitance between the two plates as a result of any axial relative movement therebetween. As will be appreciated by those skilled in the art, the opposite extremity of stator plate 24 will also extend axially beyond the corresponding end of rotor plate 28, and for the same purpose.

The operation of the variable electrical capacitor shown in FIGS. 2 and 3 is apparent. Rotation of the rotor element 26 results in a varying degree of overlap between the stator element 24 and the rotor element 28, resulting in a corresponding variation in the capacitance between these two elements. The outer radius of the rotary insulating support member 26 is substantially identical to the inner radius of the stator insulating support member 22, and these two surfaces form the bearing between the two elements, as indicated at the interface 30. The rotary bearing between the rotor and stator elements of the device of the invention thus takes the form of a journal bearing, and as will be appreciated by those skilled in the art, a very high degree of rigidity and mechanical stability is thus provided. More specifically, the capacitor plates are supported throughout their length, and by cylindrical members. Further, the use of materials of low temperature coefficients precludes undesirable capacity variations with temperature change.

The capacitor plates 24 and 28 may comprise solid metal elements suitably monnted on the respective support members, but a more preferable form, especially for a high degree of miniaturization, is achieved by the deposition of a thin metallic deposit in the respective recesses or undercut portions of the cooperating surfaces of the two insulating members; thus, the plates 24 and 28 may comprise thin metallic deposits, thus providing an opportunity for miniaturization while maintaining good mechanical stability. The desired capacity between the conductive plates 24 and 28 determines, in part, the spacing between the exposed surfaces of the two plates, but this spacing is at the least of sufficient magnitude to ensure the absence of a rubbing contact between either exposed face and the other cooperating members, so as to prevent wearing away of the capacitor plates and smearing of the metallic material of such plates over an area larger than that defined by the design of the device. In this connection, it will be observed that the journal-type bearing between the rotor and stator elements is a ceramic-to-ceramic bearing throughout, defined by the interface 30 between the two elements.

FIG. 4 shows in section form a further embodiment of the capacitor of the present invention, including a central rotary shaft 46, which, as in the case of the rotary members of each of the embodiments of this invention, may be rotated or driven by any suitable means. A first rotary insulating support member 48 is mounted on the rotary shaft 46 and has a first rotary conductive member 50 mounted thereon. Similarly, a second rotary insulating support member 52 is shown in coaxial nested relationship with the first rotary insulating support member 48, and the former having a secondy rotary conductive capacitor plate member 54 mounted thereon. Rotor members 48 and 52 are connected together and to rotary drive shaft 46 by means of a rod 56a or the like which passes therebetween to connect the several elements together for ganged operation.

The stator assembly of the variable capacitor shown in FIG. 4 includes a first stator insulating support member 58 and a second stator insulating support member 60 which are connected together by any suitable means, such as by pins 56b and c which straddle the extension 68 of drive shaft 46 and secure said stator plates to thrust washer 62 which in turn bears on rotor drive shaft 46. Stator element 58 has a first stator conductive member 64 mounted thereon, and stator element 60 has a second stator plate 66. While each of the capacitor plates 50, 64, 54 and 66 has been shown in FIG. 4 in the recessed or undercut portion of its respective insulating support member at both the upper and lower position in the figure, it will be understood that the several capacitor plates will normally comprise only a portion of a cylindrical surface, whether including at least half of such cylindrical surface (as is indicated by the showing of FIG. 4) or some other desired portion. Further, and as will be described in connection with the embodiment of FIG. 6, the capacitor plates at each of the respective radii may in actuality comprise a plurality of individual, electrically separate plates.

Suitable means will normally be provided to retain the rotor elements of the embodiment of FIG. 4 contained within the stator elements in the desired coaxial nested relationship. As indicated in FIG. 4, such means may take the form of an extension 68 of the rotary drive shaft 46, such extension extending through an aperture in the thrust washer 62 of the stator assembly to receive a washer 70 and a suitable retaining means such as cotter pin 72 or the like. The larger portion of the right-hand end of rotary drive shaft 46 serves as a thrust bearing against the inner wall of the thrust washer 62 to prevent axial displacement toward the right of FIG. 4. As in the case of the previously described embodiment, the stator conductive members 64 and 66 extend beyond the extremities of the rotor plates 50 and 54 in both directions so as to preclude an undesirable change in the capacitive relationship in the event of axial relative displacement of the several parts of the device in the operation thereof.

FIG. 5 is an end view of the embodiment in FIG. 4, illustrating the annular configuration of the several elements thereof, as well as the nested relationship therebetween. Also, the interconnecting rod 56a may be seen to include a pair of retaining means 74 and 76, which may also be cotter pins or the like. Alternately, rods 56a, b or c may be cemented in place for greater precision.

The operation of the device illustrated in FIGS. 4 and 5 is substantially identical to that of the device shown in FIGS. 2 and 3, except for the fact that the embodiment of FIGS. 4 and 5 comprises a ganged plurality of pairs of the rotor and stator elements shown in FIGS. 2 and 3. Thus, a capacitive relationship is obtained between each adjacent pair 50–64, 64–54 and 54–66. Suitable means may be provided to afford electrical conections to the respective capacitor plates. For example, rotor plate 54 may be provided with an axial extension 78 (FIG. 5) lying in a corresponding undercut portion of the insulator member 52 and extending axially to the end of such insulating member in order to make contact with a slip-ring 80 or the like. Similarly, the rotor plate 50 may be provided with an extension 82 which makes contact with a slip-ring 84. Corresponding electrical connections may be made to the several stator conductive members.

FIG. 6 shows a further embodiment of the miniature electrical variable capacitor of the present invention, including an insulating outer case 86 having a pair of electrically conductive stator plates 88 and 90 mounted thereon and separated from each other by stator insulating members 92 and 94, which are also mounted on the inner face of the case 86. A central rotary drive shaft 96 is arranged coaxially within the stator element, having a conductive rotor plate 98 and an insulating rotor member 100 mounted thereon. It will be apreciated that the showing of FIG. 6 is a central transverse section, with the space 102 between the rotor and stator elements being defined and maintained by cylindrical rotary bearing surfaces not shown in FIG. 6, but similar to those disclosed in FIGS. 2 through 5. The relatively greater thickness of the electrically conductive members 88, 90 and 98 in FIG. 6 is intended to indicate the use of a self-supporting conductive member, as opposed to the deposited conductive film mentioned above. The semicylindrical or partial cylindrical members 88, 92, 90, 94, 98 and 100 may be individually formed and separately placed in position within the device indicated in FIG. 6, especially where the degree of miniaturization called for does not require the thin films of the previous figures.

In FIG. 6, it will be noted that a single rotor conductive member 98 is nested in coaxial relationship within a pair of stator conductive members 88 and 90, with the latter members being disposed at a common radius of the nest. A pair of electrical terminals 104 and 106 are provided, providing electrical connections to stator plates 88 and 90, respectively. No conductive electrical connection is made to the rotor plate 98, since the capacitance variation is achieved between terminals 104 and 106 by means of a rotation of shaft 96 and the corresponding variation in the degree of overlap between the rotor plate 98 and the two stator plates 88 and 90. The operation of the embodiment illustrated in FIG. 6 is thus apparent, with the capacity between plates 88 and 90 increasing as rotor plate 98 is rotated clockwise from its present position to a position of maximum capacitance at the point of maximum mutual overlap between the rotor plate 98 and both of the stator plates. Further rotation beyond such position results in a decrease in the capacitance to a position of minimum capacitance where there is no overlap or superposition of both stator plates with the rotor plate. The apparatus of FIG. 6, because of the absence of moving, flexing or turning connections, is extremely noise free.

FIG. 7 shows a further embodiment of the interconnecting or ganging means illustrated in FIGS. 4 and 5.

In FIG. 7, a rotary drive shaft 108 is shown in coaxial nested relationship with a pair of rotor elements 110 and 112 and a pair of stator elements 114 and 116. Rotor element 110 is mounted directly on drive shaft 108, with the latter carrying a drive rod 118 which is fixedly secured to the shaft 108 and which extends radially a sufficient distance to engage a stop member 120 positioned on the near end of the rotor cylinder 112.

In the operation of the device illustrated in FIG. 7, clockwise rotation of the rotor shaft 108 from its illustrated position results in relative rotation between the rotor member 110 and the adjacent stator member 114, resulting in a capacity variation which depends upon the particular configuration of the respective rotor and stator plates mounted thereon. Upon the near-completion of one cycle of rotation, the drive rod 118 will engage the stop member 120 and then carry the rotor member 112 through clockwise rotation with the first rotor element 110, thus producing a desired capacitance variation between the rotor plates mounted on 112 and the stator plates mounted on either stator member 114 or 116, or both. Obviously, the embodiment illustrated in FIG. 7 is subject to many variations as to both the manner of electrical interconnection as well as the cumulative mechanical drive connection.

The invention has been described above in considerable detail, and particularly with reference to its application to variable electrical capacitors in the ordinary sense. However, it will be apparent to those skilled in the art that the invention is also applicable to other circuit devices which call for a variable capacitance relationship between a pair of terminals. Hence, the invention is not to be considered as limited to the particular details given, nor to the specific application to which reference has been made during the description of the apparatus except insofar as may be required by the scope of the appended claims.

What is claimed is:

1. A miniature precision variable electrical capacitor comprising an inner cylindrical insulating support member, an outer cylindrical insulating support member encircling the inner support member and coaxial therewith, said outer support having an inner surface providing a cooperating bearing surface with an outer surface of said inner support member for permitting relative rotary movement therebetween, a first semicylindrical electrically conductive plate mounted in said bearing surface of the inner support member and supported thereon throughout its length, and a second semicylindrical electrically conductive plate mounted in said bearing surface of the outer support member and supported thereon throughout its length, said plates being rotatable about a common axis with the respective support members into overlying relation with one another for varying the capacitance therebetween, an air gap being provided between the plates when in overlying relation.

2. An electrical capacitor as set forth in claim 1 wherein at least one of the conductive plates is recessed into the surface on which it is mounted, an air gap being provided between the plates when in overlying relation, the air gap being of a size controlled in part by the desired capacity between the plates.

3. An electrical capacitor as set forth in claim 1 wherein at least one of the conductive plates is a thin metallic deposit.

4. An electrical capacitor as set forth in claim 1 wherein an electrical terminal extends through said outer support member into contact with said second conductive plate thereon, and a second electrical terminal extends through the outer support member in insulating relation to said second conductive plate thereon, said second terminal being retained in sliding contact with said first conductive plate on the inner support member.

5. An electrical capacitor as set forth in claim 1 wherein means are provided at each end for preventing axial relative movement of the support members.

6. An electrical capacitor as set forth in claim 1 wherein additional cylindrical insulating support members are mounted upon said outer support member in coaxial encircling relation thereto, said additional support members having cooperating bearing surfaces between one another and with the outer surface of said outer support member, and additional semicylindrical conductive plates mounted on each of said surfaces and supported thereon throughout their lengths, said additional conductive plates being rotatable with their respective support members about a common axis for providing a ganged capacitor.

References Cited by the Examiner

UNITED STATES PATENTS 2,305,355  12/1942  Lips et al. _____ 317—249
2,715,681   8/1955  Campbell _____ 317—249 X

FOREIGN PATENTS 500,090  11/1954  Italy.

OTHER REFERENCES

Siemens: German Printed App. No. 1,104,613, Pub. April 13, 1961.

JOHN F. BURNS, *Primary Examiner.*